Aug. 16, 1966     J. M. MALEK     3,266,556
HEAT EXCHANGERS
Filed Feb. 13, 1963
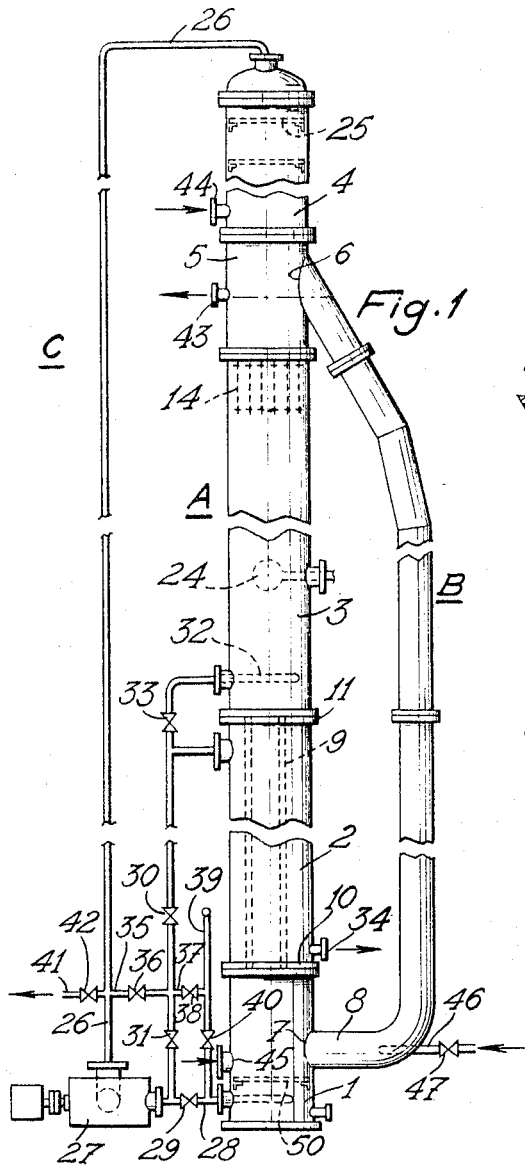
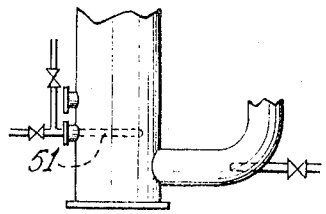
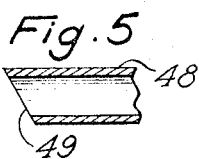
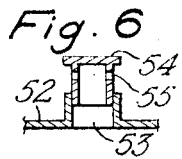
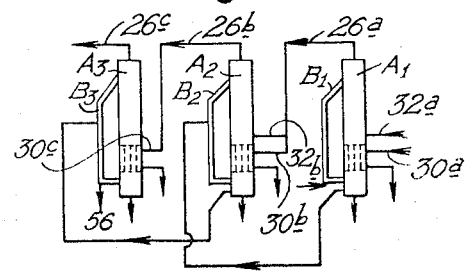
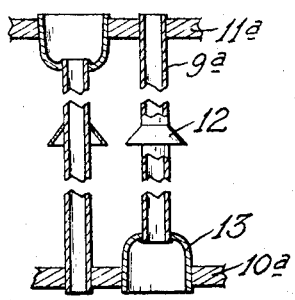
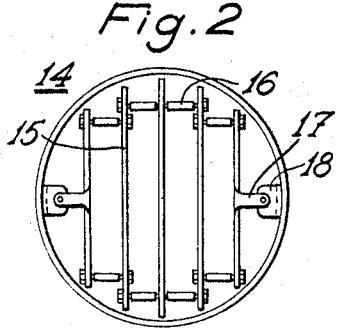
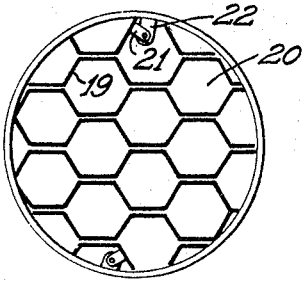

United States Patent Office                                      3,266,556
                                                          Patented August 16, 1966

3,266,556
HEAT EXCHANGERS
Jan Michal Malek, 15 Allee Brimborion, Bellevue-
Meudon, Seine-et-Oise, France
Filed Feb. 13, 1963, Ser. No. 258,192
Claims priority, application France, Feb. 14, 1962,
887,963, Patent 81,168
11 Claims. (Cl. 159—16)

Free recirculation heat exchangers have already been constructed which can be used as boilers, evaporators or subsidiary heaters and which comprise two vertical columns intercommunicating through their bases and their tops, of which the first, a heated column, is supplied with liquid to be treated and successively comprises from bottom to top a base section, a heating chamber receiving, on the one hand, said liquid which is to be brought to boiling and, on the other hand, a heating fluid, an evaporation chamber for said liquid and a separator for separating its liquid and said vapors, and from which the latter are exhausted, while the second column, the function of which is to recirculate the liquid to be treated, joins the bottom of the separator to said base section, whereby to cause the liquid to be treated to flow in a closed circuit within the apparatus.

The present invention has for its main object to provide for modifications to a heat exchanger of the type described above to adapt it for use not only as an improved evaporator but also as a chemical reactor, a condenser, a fluidizer, an extractor operating in the liquid phase, a heater or a cooler.

It is a further object of the invention to provide a second circuit for recirculating at least part of the gaseous phase, whereby to reinforce the intensity of circulation of the liquid to be treated by bubbling said gaseous phase through the liquid undergoing treatment.

It is another object of the invention to provide for introducing and distributing into the heat transfer column a live gaseous phase or relatively compressed inert gases or vapors as a motive power for recirculating the fluent material which may be a liquid, or solid pellets in cases where a fluidized bed is employed.

It is another object of the invention to provide for increasing the motive force of circulation of the fluent material, by producing, in a chamber for the emulsification and the anticoalescence of gaseous bubbles, which contains means for dispersing as an emulsion (and for impeding the interfusion) the gas phase bubbles obtained from said introducing and distributing of the gaseous phase into the heat transfer column, a relatively homogenous mixture of the fluent material with the gaseous bubbles, and consequently diminishing the average specific weight of the contents of the heat transfer column, the specific weight of the fluent material in the recirculation conduit or downcomer remaining constant.

Said fluent material thus freely recirculates in a closed circuit within the apparatus as a consequence of the difference of pressures exerted at the bottom of said apparatus by the fluent material in the recirculation conduit or downcomer, on the one hand, and, on the other hand, by the mixture of relatively low specific weight of this fluent material with gas phase emulsion in the heat transfer column.

It is another object of the invention to provide for introducing into the heat transfer column live gaseous phase or compressed inert gases or vapors as supplementary motive power for circulating the liquid to be treated, or the solid particles in cases where a fluidized bed is involved.

It is yet another object of the invention to provide for forcibly introducing fluid into the connection between the bases of the transfer column and first circulation circuit whereby to facilitate circulation.

Yet another object of the invention is to provide a battery of heat exchangers of the type hereinbefore described, which exchangers are series-connected and form a multiple-effect evaporator, the live gaseous phase offtake from the second recirculating circuit of each exchanger being introduced into the subsequent exchanger.

A still further object of the invention is to make provision, in the case of a heat exchanger with a fluidized bed, for increasing the rate of flow of the granular vehicle as the rate of circulation of the fluid fluidizing the bed increases, said granular vehicle being lubricated by dry lubricants which are good heat conductors.

The description which follows with reference to the accompanying drawings, which are filed by way of example only and not of limitation, will give a clear understanding of how the invention can be carried into practice and will reveal yet further particularities thereof.

In the drawings:

FIG. 1 is a diagrammatic side elevation view with fragmentary cutaway of a free recirculation heat exchanger in accordance with this invention;

FIGS. 2 and 3 are schematic cross-sectional views of two embodiments of the emulsifying and anticoalescing walls;

FIG. 4 is a schematic illustration of an embodiment of the base of a heat exchanger according to the invention;

FIG. 5 is an enlarged sectional view of the end of an injector for injecting fluid into the interconnection between the bases of the transfer column and first recirculating circuit of the exchanger shown in FIG. 1;

FIG. 6 is a fragmentary sectional view of a retaining plate for the vehicle of an exchanger with a fluidized bed;

FIG. 7 is a diagrammatic view of a multiple-effect evaporation battery, each element of which is of the type shown in FIG. 1; and FIG. 8 is a cross-section taken through the tube cluster of one of the heat exchange sections of the unit of FIG. 7.

Referring first to the embodiment shown in FIG. 1, the heat exchanger illustrated therein comprises a vertical column A and two substantially vertical conduits B and C respectively connected to the base and the top of said column.

Column A, which is the transfer column, successively comprises from bottom to top a base section 1 which can be placed directly on the ground as in the case of the conventional distillation columns, a heat transfer chamber 2, an emulsifying and anticoalescing chamber 3, which will be termed hereinafter as a homogenizer and separation chamber 4. Conduit or downcomer B, which is the first recirculating conduit for the liquid to be treated or the granular phase of a fluidized bed, consists of tubular sections the diameter of which is relatively large but less than that of the sections of column A. Said conduit B is connected to a barrel-plate 5 surmounting homogenizer 3 at joint 6 and is connected to the base section 1 at joint 7 by a bend section 8.

Within the heat transfer chamber 2 is disposed a culster of vertical tubes 9 extending through and beyond the end plates 10 and 11 of said chamber which plates are provided with perforations interconnected by said tubes.

The homogenizer 3 is provided in its upper part with a set of homogenizing walls 14, which walls, as shown in the embodiment in FIG. 2, consist of a plurality of smooth plates 15 which are assembled parallel with one another by means of bolted tie-rods 16 and which are arranged vertically within the homogenizer and secured through lugs 17 to supports 18.

As shown in the embodiment in FIG. 3, said homogenizing walls consist of plates 19 which are bent and welded to form hexagonal-section vertical cells 20. This honeycomb system is suspended inside the homogenizer from lugs 21 and supports 22.

The homogenizer further comprises, beneath the rigid homogenizing walls, an ultrasonic generator 24 adapted to facilitate homogenization of the fluid mixture or the fluidized bed.

In its upper part, separator 4 comprises a set of perforated plates 25 provided with a layer of metallic fabric and adapted to ensure mechanical scrubbing of the vapors or the gaseous phase issuing from the transfer column through conduit C.

Conduit C includes a pipe 26 connected to a compressor pump 27 which serves to reinject the gaseous phase either into base 1 through a pipe 28 fitted with a shut-off valve 29 or, into the top of a transfer chamber through the pipe equipped with shut-off valves 30 and 31, or into the base of the homogenizer through a pipe incorporating shut-off valve 33 and perforated tube 32. The heat transfer fluid escapes through 34. Pipe 28, in conjunction with part of the pipe containing valve 31, can serve as a by-pass for the pump 27 by interconnecting the pipe with valve 30 and pipe 26 by means of a pipe 35 incorporating a shut-off valve 36. The pipe with valve 30 can be joined through a pipe 37 incorporating a shut-off valve 38 to a pipe 39 which serves to introduce vapor or complementary gas without action on the contents of the exchanger. Said pipe 39 is additionally connected to pipe 28 with an interposed shut-off valve 40. Lastly, pipe 26 is connected to a degasifying pipe 41 incorporating a shut-off valve 42.

The heat exchanger thus formed comprises two O-shaped closed circuits having column A as their common branch, which circuits have as their respective functions to recirculate the liquid to be treated or the granular phase of a fluidized bed through first conduit B, and to recirculate vapor through second conduit C and pump 27. The level of the liquid to be treated is maintained by an overflow 43 at the level of the joint 6 of circuit B with barrel-plate 5.

The liquid to be treated can be introduced either through the base section of the separator at inlet 44, through which the solid particles of a fluidized bed are introduced, or into the base at inlet 45. A pipe 46 with shut-off valve 47, placed on the horizontal branch 8 of conduit B and extended by an injector 48 (see FIG. 5) serves, in the case of a fluidized bed, to introduce a fluid for accelerating circulation of the solid particles. This injector consists of a tube having an end section 49 which is cut off obliquely downwards and backwards in order to prevent said tube from being clogged with grains when the fluidized-bed-type apparatus is operating.

Base section 1 contains either a perforated plate 50 (see FIG. 1), or an injector 51 (FIG. 4) for distributing the live gaseous phase compressed by the compressor pump 27 and introducing same into the solution filling the transfer column. In the case of a fluidized bed, it is preferable to use a plate which simultaneously acts as a support for the bed and comprises a bottom 52 embodying holes 53 with raised edges, which holes are stopped by plugs 54 having perforations 55 therein (see FIG. 6). The part played by the emulsifying and anti-coalescing chamber or homogenizer 3 is to impede the interfusion of the gaseous phase bubbles produced by the gaseous phase distributing means 50 or 51 and to disperse these bubbles as an emulsion in the material to be treated, so that a relatively homogeneous mixture of these two phases is obtained in order to diminish the average specific weight of the contents of the column.

The material to be treated thus freely recirculates in the O-shaped circuit A–B as a consequence of the difference of the pressures exerted at the bottom of the apparatus by the material in the downcomer B, on the one hand, and, on the other hand, by the relatively weak average specific weight mixture of this material with gas phase emulsion bubbles in the heat transfer column A.

The multiple-effect evaporator shown in FIG. 7 comprises three elemental exchangers of the type illustrated in FIG. 1.

In the evaporator of FIG. 7, the transfer columns A1 and A2 are adapted to receive at the base of their homogenizers an injection of live gaseous phase through inlet pipes 32a and 32b respectively, pipe 32b being connected to the gaseous phase outlet pipe 26a on column A1. The third transfer column A3 receives no live gaseous phase injection in order to avoid excessive loss of heat in the condensers. The successive columns A2 and A3 are fed with heat transfer fluid from pipes 26a and 26b. The treated liquid tapped from the base section of each column A is reinjected into the first circuit B of the next elemental exchanger, the treated liquid being tapped at 56, at the base of the first recirculation circuit B3. The last transfer column is connected through the gaseous phase outlet pipe 26c to a vacuum pump.

Within the heat transfer chamber of each column A1, A2, A3 is disposed a tube cluster in which each vertical tube 9a (FIG. 8) is provided with external frusto-conical collars 12 fixed to the tubes by their smaller upwardly directed bases. One extremity of each tube is connected to one of plates 10a or 11a through the medium of a flared cup 13, and the outer diameter of cup 13 is greater than the diameter of the larger base of said frusto-conical collars 12 to enable the tubes to be assembled between the two plates.

The heat exchanger hereinbefore described, when utilized as a reactor, offers the advantage of eliminating all mechanical agitation by substituting therefor an intense closed-circuit circulation of the vapors and the liquids or of the granular bodies (in the case of a fluidized bed) under the action of a compressor. When the heat exchanger is used as a condenser, since the vapors condense on the outside of the tubes, the high rate of circulation and possible boiling of the cooling liquid above the heating walls allow for eliminating the formation of scale on the inner tube walls. Where the heat exchanger operates with a fluidized bed, the homogenization of the latter and the intensification of the transfers resulting from the action of the ultrasonic generator preclude the formation of biased streams in the upper part of the fluidized bed. In order to reduce pressure losses and thereby make the circulation more intense, the grains of the fluidized bed are lubricated with dry lubricants which are good heat conductors, an example being graphite.

For operation as an extractor, the liquid recirculation circuit and transfer column are filled with heavy-phase liquid, after which the light-phase liquid is introduced through the taps 28 or 45. The unit can furthermore be utilized as a recompression-type evaporator through the reintroduction of part of the vapors which are recycled and compressed in the transfer column, in which case ribs such as the collars 12 in FIG. 8 allow for notably reducing the thickness of the liquid film of condensate trickling down the tube cluster and thereby increasing the heat transfer-coefficient.

The heat exchanger as hereinbefore described can alternatively serve as means for merely heating or cooling fluid of any type whatsoever, the circulation being made intense through the introduction of an inert gas bubbled through the base 1.

What I claim is:

1. A free recirculation heat exchanger comprising a hollow vertical heat transfer column in which a fluent material and a gaseous phase undergo treatment and are subject to heat transfer, said column having an inlet for the introduction of gaseous phase thereinto to reduce the density of the material in the column, means in said column associated with the latter inlet for distributing the gaseous phase within the column, first conduit means connected to said column for the recirculation of fluent material therein, means for introducing fresh fluent material into the assembly constituted by the column and the first conduit means, said column including a succession of chambers which from bottom to top include a base chamber to which the lower end of the first conduit means connects, a heat transfer chamber of the indirect heat transfer type, said heat tarnsfer chamber having inlet and outlet connections for a heat transfer fluid, an emulsifying and anticoalescing chamber including at the upper portion thereof a multiplicity of substantially vertical partition plates for emulsifying the gaseous phase and the fluent material, and a separation chamber for separating said gaseous phase and said fluent material, said separation chamber having a gaseous phase outlet and a fluent material outlet, said first conduit means being connected at its upper end to said fluent material outlet.

2. A free recirculation heat exchanger as claimed in claim 1, wherein said inlet for the introduction of gaseous phase is in said base chamber, said means for distributing the gaseous phase being disposed in said base chamber and comprising a horizontal perforated plate which is located between said inlet for the gaseous phase and the location where said first conduit means opens into said base chamber.

3. A free recirculation heat exchanger as claimed in claim 1, comprising tie-rods assembling said partition plates together, lugs affixed to certain of said plates, and supports fixed to the walls of said emulsifying and anticoalescing chamber and supporting said lugs.

4. A free recirculation heat exchanger as claimed in claim 1, wherein said vertical partition plates in the upper portion of said emulsifying and anticoalescing chamber are bent and secured together to form vertical honeycomb cells, lugs affixed to certain of said plates, and supports fixed to the walls of said emulsifying and anticoalescing chamber and supporting said lugs.

5. A free recirculation heat exchanger as claimed in claim 1, which comprises means for generating mechanical vibrations in the mixture of said fluent material and said gaseous phase and located in the lower part of said emulsifying and anticoalescing chamber.

6. A free recirculation heat exchanger as claimed in claim 5, wherein said means for generating mechanical vibrations comprises an ultrasonic generator.

7. A free recirculation heat exchanger as claimed in claim 1, wherein said heat transfer chamber comprises a lower perforated plate and a upper perforated plate, tubes connecting said upper and lower perforated plates, frusto-conical collars having smaller upwardly directed bases exteriorly affixed to said tubes and, for each tube, a flared cup fixed at its narrower end to one tube extremity and extending at its wider end into the perforations of a corresponding plate, the outer diameter of said cup being greater than the diameter of the larger base of said frusto-conical collars.

8. A free recirculation heat exchanger as claimed in claim 1, which comprises a substantially vertical pipe for the separated gaseous phase connected at one end to said gaseous phase outlet of the separation chamber, a compressor pump connected to the other end of said pipe, and a delivery pipe connecting said compressor pump to said inlet for the introduction into the column of gaseous phase.

9. A free recirculation heat exchanger as claimed in claim 1, which comprises injector means at the lower end of said first conduit means and means for feeding a fluidizing fluid to said injector.

10. A free recirculation heat exchanger as claimed in claim 1, wherein said fluent material to be treatetd and recirculated is mixed with a heat conducting dry lubricant.

11. A battery of free recirculation heat exchangers connected in series to form a multiple-stage evaporator, each exchanger comprising a liquid inlet for introducing into the exchanger a liquid to be evaporated and to be recirculated, a hollow vertical column which successively comprises, from bottom to top, a base chamber, a heat transfer chamber of the indirect heat transfer type which has a fluid inlet and a fluid outlet for the respective introduction and discharge of a heat transfer fluid, an emulsifying and anticoalescing chamber including at the upper portion thereof a multiplicity of substantially vertical partition plates for emulsifying the liquid being evaporated with its produced gaseous phase, a separation chamber for separating said liquid being evaporated from the gaseous phase which it produces, and including a liquid outlet and a gaseous phase outlet; a substantially vertical conduit joining the liquid outlet of said separation chamber and said liquid inlet for the recirculation of liquid, and a discharge pipe for the separated gaseous phase connected at one end of said gaseous phase outlet, the discharge pipe of the last exchanger being adapted for connection to a vacuum pump for removal of said gaseous phase thereat, said discharge pipes of each one of the other exchangers being connected to the fluid inlet connection of the heat transfer chamber of the next exchanger, ducts connecting the base chamber of each column with the exception of that of the last column of the battery to an intermediate section of the vertical conduit of the next exchanger, ducts connected to the bottom of the emulsifying and anticoalescing chambers with the exception of that of the last exchanger for introducing live gaseous phase into the emulsifying and anticoalescing chambers, and, for each intermediate exchanger, a duct interconnecting the corresponding live gaseous phase introducing duct and the discharge pipe of the previous exchanger.

References Cited by the Examiner

UNITED STATES PATENTS

| | | | |
|---|---|---|---|
| 2,257,531 | 9/1941 | Peebles | 159—14 X |
| 2,426,839 | 9/1947 | Morris | 209—139 X |
| 2,561,394 | 7/1951 | Marshall | 159—48 X |
| 2,579,203 | 12/1951 | Putney. | |
| 2,783,187 | 2/1957 | Odell | 209—474 X |
| 2,819,951 | 1/1958 | Medlin et al. | 23—288.3–S |
| 2,899,284 | 8/1959 | Nathan | 34—57–A |
| 2,949,447 | 8/1960 | Hawkins et al. | |

FOREIGN PATENTS 119,028   6/1947   Sweden.

NORMAN YUDKOFF, *Primary Examiner.*

KENNETH W. SPRAGUE, *Examiner.*

J. SOFER, *Assistant Examiner.*